(12) United States Patent
Kawachiya et al.

(10) Patent No.: US 9,858,159 B2
(45) Date of Patent: Jan. 2, 2018

(54) FAULT TOLERANT DISTRIBUTED COMPUTATION

(71) Applicant: International Business Machines Corporation, Armonk, NY (US)

(72) Inventors: Kiyokuni Kawachiya, Yokohama (JP); Vijay A. Saraswat, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 14/627,312

(22) Filed: Feb. 20, 2015

(65) Prior Publication Data
US 2016/0246689 A1    Aug. 25, 2016

(51) Int. Cl.
*G06F 11/00* (2006.01)
*G06F 11/14* (2006.01)

(52) U.S. Cl.
CPC .......... *G06F 11/1471* (2013.01); *G06F 11/00* (2013.01); *G06F 2201/805* (2013.01); *G06F 2201/85* (2013.01)

(58) Field of Classification Search
CPC .. G06F 11/3006; G06F 11/1471; G06F 11/00; G06F 2201/805; G06F 2201/85
See application file for complete search history.

(56) References Cited

U.S. PATENT DOCUMENTS 6,542,929 B1    4/2003 Briskey et al.
6,704,806 B1 *  3/2004 Decker ................ G06F 9/4843
                                          717/127

2005/0204034 A1 *  9/2005 Betarbet ............. G06F 11/3006
                                              709/224

(Continued)

FOREIGN PATENT DOCUMENTS

JP    H0612352 A    1/1994
JP    H08314875 A   11/1996

(Continued)

OTHER PUBLICATIONS (David Cunningham et al. Resilient X10: efficient failure-aware programming. In Proceedings of the 19th ACM SIGPLAN symposium on Principles and practice of parallel programming (PPoPP '14), Orlando, Florida (Feb. 15-19, 2014), ACM, New York, NY, USA, 67-80).*

(Continued)

*Primary Examiner* — Jason Bryan
(74) *Attorney, Agent, or Firm* — Vazken Alexanian; Michael J. Chang, LLC

(57) ABSTRACT

The present information processing apparatus executes fault-tolerant distributed computing through a network and the information processing apparatus comprises: a finish initiator that creates a finish state on a home node; an activity creator that instructs to create at least one activity on a remote node; an activity launcher that allows to store in a resilient store a value indicating that at least one live activity is present on the remote node; an activity closer that decreases the number in the local memory when the living activity is completed and resets the value in the resilient store to indicate that no live activity is present on the remote node; and a finish closer that closes the finish state when the value stored in the resilient store indicates an absence of remote nodes having at least one live activity.

17 Claims, 14 Drawing Sheets

(56) References Cited

U.S. PATENT DOCUMENTS

2013/0013833 A1* 1/2013 Nagpal .................... G06F 9/52
710/200
2013/0339805 A1* 12/2013 Aho .................... G06F 11/3006
714/48

FOREIGN PATENT DOCUMENTS

JP           2000010806 A     1/2000
JP           2001117895 A     4/2001

OTHER PUBLICATIONS

English Abstract of JPH08314875A, filed by Kamiyo Hiroo et al.; Mitsubishi Electric Corp. (Nov. 29, 1996).
English Abstract of JPH0612352A, filed by Sasaki Takayuki et al.; Cannon (Jan. 21, 1994).
English Abstract of JP2000010806A, filed by Ando Nobuyoshi et al.; Hitachi (Jan. 14, 2000).
English Abstract of JP2001117895A, filed by Kenneth C. Briski et al.; IBM (Apr. 27, 2001).
D. Cunningham et al., "Resilient X10: Efficient Failure-Aware Programming," Proceedings of the 19th ACM SIGPLAN Symposium on Principles and Practice of Parallel Programming (PPoPP '14), pp. 67-80, Aug. 2014.
S. Crafa et al., "Semantics of (Resilient) X10," Proceedings of the 28th European Conference on Object-Oriented Programming (ECOOP '14), Jul./Aug. 2014.
K. Kawachiya et al., "Writing Fault-Tolerant Applications Using Resilient X10," X10 Workshop Jun. 2014.

* cited by examiner

*Fig. 10*

Transaction to RS

| CODES | TRANSACTION (COMPARABLE EXAMPLE) | TRANSACTION (EXAMPLE) |
|---|---|---|
| make () | 1 | 0 |
| fork () | 1 | 0-1 |
| begin () | 1 | 0-1 |
| pushExc ( ) | 1 | 0 |
| join () | 1 | 0-1 |
| wait () | 2 | 0-1 |

*Fig. 11*

Relative Improvement in Computation Performance

|  | Comparable Example | Present Example |
|---|---|---|
| Cost for Creation and wait of Empty Activity within Particular Node | 1 | 0.023 |
| Cost for Creation and wait of Empty Activity between Different Node | 1 | 0.57 |
| Application Execution Time (ResilientHeatTransferx10 executed by 8 nodes) | 1 | 0.56 |

FAULT TOLERANT DISTRIBUTED COMPUTATION

STATEMENT OF GOVERNMENT RIGHTS

This invention was made with Government support under Contract number FA8750-13-C-0052 awarded by U.S. Air Force Office of Scientific Research. The Government may have certain rights in this invention.

FIELD OF THE INVENTION

The present invention relates to a distributed computation technology and particularly relates to fault-tolerant distributed computation between computing nodes through a network.

BACKGROUND OF THE INVENTION

Distributed computation between computation nodes may be used to improve computation capacity or performance. Many distributed computing mechanisms are known (e.g., a system implemented and operated under a programming language X10).

The distributed computing mechanism operated under the programming language X10 includes a home node and at least one remote node. The home node instructs the distributed computation by creating activities in the home node and the remote nodes. An activity can create other activities in these nodes. The home node waits for the termination of all activities. Hereafter, it is noted that the term "home node" and the term "remote node" refer to respective computing nodes including computers playing roles therefor. The home node manages whole computations distributed to the nodes and generates the final result of the computation. Each of the nodes computes something according to the role allocated by the program by generating an activity or activities and returns the result thereof to the home node after the computation thereof has finished successfully.

In the above distributed computing mechanism operated under the X10 programming language, a fault of a particular node leads directly to the failure of computation. Recently, a programming language Resilient X10 has been proposed. The Resilient X10 programming language can overcome the fault of a particular node and make it possible to complete the objective computation using nodes alive at that time, by storing necessary data to check the termination of all activities into a so-called "resilient store." The computing mechanism operated under the Resilient X10 programming language is reviewed, for example, in D. Cunningham et al., "Resilient X10: Efficient Failure-Aware Programming," Proceedings of the 19th ACM SIGPLAN Symposium on Principles and Practice of Parallel Programming (PPoPP '14), pages 67-80, August 2014 (hereinafter "Cunningham"); S. Crafa et al., "Semantics of (Resilient) X10," Proceedings of the 28th European Conference on Object-Oriented Programming (ECOOP '14), July/August 2014; and K. Kawachiya et al., "Writing Fault-Tolerant Applications Using Resilient X10," X10 Workshop June 2014.

As known distributed computing mechanisms, Japanese Patent JPH08314875 A, entitled "Cooperative Distributed Processing Method, Distributed Shared Memory Monitoring Device, Distributed Shared Memory Network Tracking Device and Distributed Shared Memory Network Setting Supporting Device" (hereinafter "Japanese Patent JPH08314875 A") discloses the distributed computing mechanism for backup lost functions of the faulted distributed node. The system in Japanese Patent JPH08314875 A uses a distributed shared memory on which a status monitor table and data shared in each of the distributed nodes are placed. When a particular node suffers a fault, the lost functions are replaced among the normal nodes.

Japanese Patent JPH0612352 A, entitled "Method and Device for Processing Information and Information Processing System," (hereinafter "Japanese Patent JPH0612352 A") discloses an information processing method for maintaining the consistency of data. The system in Japanese Patent JPH0612352 A acknowledges data change on the host and the host acknowledges the change of the data to a sender of the data. When the sender host suffers a fault, the host sends the fault-acknowledgement to the other hosts in the network.

However, there is still a need in the art to improve computation performance while keeping the excellent fault-tolerance of the Resilient X10 programming language.

SUMMARY OF THE INVENTION

An object of the present techniques is to provide a distributed computing method that is durable to a fault.

Further, another object of the present techniques is to provide a distributed computing method with improved computing performances while keeping the excellent fault-tolerance ability.

Further, another object of the present invention is to provide a distributed computing mechanism with improved computing performances while not deteriorating the fault-tolerance ability.

Still further, another object to the present invention is to provide a program product which stores program codes for implementing a distributed computing mechanism with improved computing performances while keeping the fault-tolerance ability based on an extended Resilient X10 programming language.

The above objectives of the present techniques may be solved by providing the distributed computation mechanism based on the present extension of the Resilient X10 programming language.

The present techniques leverage the understanding that all activities in the failed node are lost at the same time and exceptions can be lost when the home node is down. Thus the resilient store knows only of the presence of live activities in the remote node to address to a fault recovery, rather than storing all of the data for computing nodes in the resilient store. In this context, the status information other than the live activities (such as numbers of live activities, exceptions, etc.) may be stored separately in a non-resilient memory rather than in the resilient store.

In the resilient store, the resilient live indicator (RLI) is defined for each of the remote nodes being controlled. The value of RLI is set to a non-zero value when the respective node starts the execution of an activity, i.e., a live activity, and the value of RLI is reset to zero when all of the live activities in the respective node are completed.

Besides the above described features, the number of activities living on the remote node may be stored in the memory in that node independently from the RLI. The information of exceptions may also be stored in the memory of the home node rather than in the RLI.

According to the present techniques, the storage access of the programming codes may be directed to two paths including the resilient store and the non-resilient memory; the information that the remote node has one or more living activities may be stored in the resilient store so that accesses to the resilient store may be decreased because other accesses are replaced with the fast non-resilient memory accesses. Thus, the present techniques can improve performance of the distributed computation.

A more complete understanding of the present invention, as well as further features and advantages of the present invention, will be obtained by reference to the following detailed description and drawings.

BRIEF DESCRIPTION OF DRAWINGS

FIG. 10 shows a comparison of RS access between the present extended Resilient X10 programming language (example) and the conventional Resilient X10 programming language (comparable example).

FIG. 11 shows the result of a practical computation implementing the present extended Resilient X10 programming language.

DETAILED DESCRIPTION OF PREFERRED EMBODIMENTS

The present techniques will now be explained using particular embodiments and the embodiments described hereafter are understood to be only examples and do not limit the scope of the present invention. The present distributed computation mechanism includes a home node and at least one remote node, and source and destination nodes, each of which will play different roles in the distributed computation. It is noted that the designations (home, remote) and (source, destination) are different categories. The (source, destination) are defined for each activity creation, and a node can become either a source or destination node. The home node creates a new finish state and manages the distributed computation of the nodes under control of the home node. The source node creates at least one new activity in a particular destination node and the activity may further create other activities. All of the activities are managed by the home node. The role of the nodes may not be fixed and the role of a particular node may be different depending on the particular computation.

The home node summarizes the results of activities and generates the final result of the distributed computation—for that purpose, a data structure named "finish state" is created in the home node. Finish state is a data structure also used in the original X10 to store various information related to the corresponding distributed execution started by the finish initiator make( ). In the Resilient X10 paradigm, a resilient store (hereafter referred to simply as RS) is prepared so as to make the distributed computation resilient (i.e., fault tolerant). The resilient store may be connected to the nodes through a network such as the Internet and stores the computing statuses of the nodes. According to the present techniques, RS accesses of the node may be limited and thus, the RS accesses from the nodes may be decreased to a minimum frequency so as to improve the entire computation performance.

Figure 1:
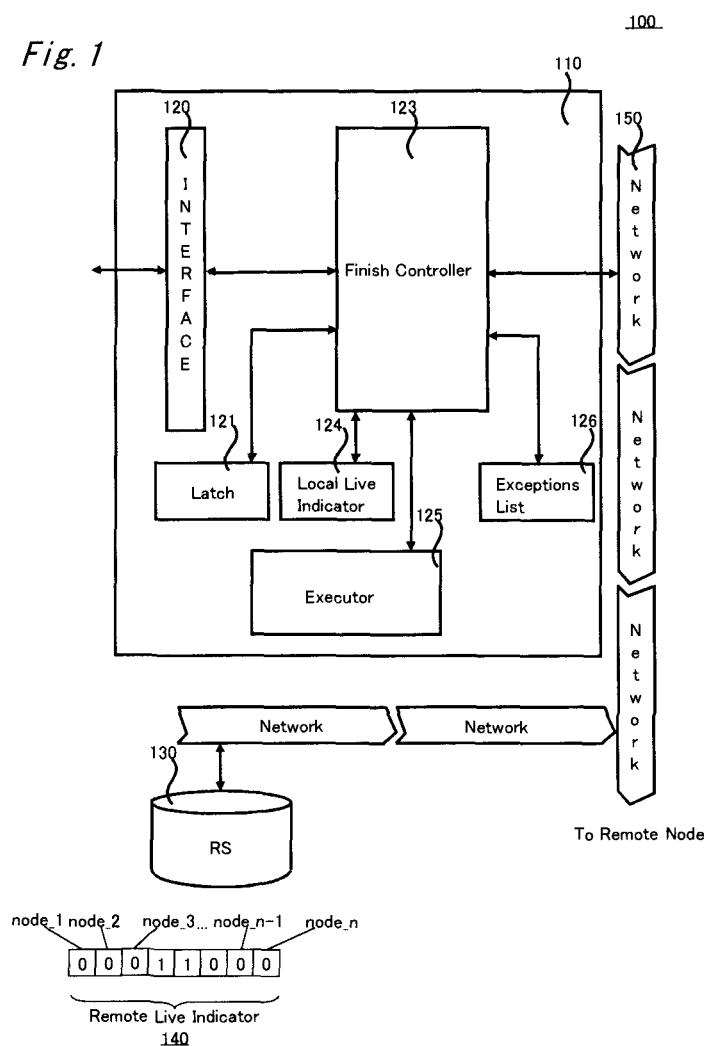
FIG. 1 shows a functional block diagram of an information processing apparatus of the computing node for the home node.

FIG. 1 shows a functional block diagram 100 of an information processing apparatus 110. The information processing apparatus 110 includes an interface 120 and a finish controller 123. The interface 120 receives inputs through input/output devices from outside of the information processing apparatus 110 so as to manage the operation of the information processing apparatus 110 by an operator and/or external instruction information. The finish controller 123 may include the codes of the present extended Resilient X10 programming language. The codes may be invoked depending on the role of the information processing apparatus 110 in the distributed computation, such as whether the information processing apparatus 110 is the home node, remote node, source node, or destination node.

The finish controller 123 manages the distributed computation of the remote nodes under its control and records the computation statuses thereof to RS 130. RS 130 may be implemented as a fault tolerant data store system for storing the information securely. Furthermore, the finish controller 123 may use conventional communication protocols to poll the remote nodes as to whether or not a particular remote node suffers a fault.

The information processing apparatus 110 further includes an executor 125 which, by the execution of objective computations, generates the final result. The information processing apparatus 110 manages RS 130 for storing the computation status of the remote nodes that are received via network 150 (which is, for example, a local area network (LAN), the Internet, Token ring, etc.).

According to an exemplary embodiment, RS 130 stores the computation statuses of the remote nodes in the data structure called the "remote live indicator" (hereafter simply referred to as RLI) 140. RLI 140 may be constructed as a simple array which includes binary values indicating whether or not the particular remote node has live activity or activities. The values in the array are however not limited to binary values but can more generally be any type of information that indicates whether or not the particular remote node has live activity or activities. By way of example only, the value of the particular remote node may become binary 1 when at least one live activity is created and the value is kept when at least one live activity is present on the particular node. The value of a subject remote node may be zero (0) when all of the live activities have successfully completed in the particular node. Therefore, RLI 140 indicates whether or not the particular remote node under its control has at least one live activity with respect to each of the remote nodes in the distributed computation. The term "live" as used herein when referring to an activity on a node means that program code of the activity is invoked on the node and occupies certain parts of a local memory for the processing of the program code on the (computing) node.

The information processing apparatus 110 includes a local live indicator (hereafter referred simply to LLI) 124, a latch 121, and an exceptions list 126 in the local memory of the information processing apparatus 110 rather than in the RS 130. The latch 121 will be released when all of the activities for the finish state are completed. When the latch is released, the relevant process that is running and occupying the hardware resources will be ready to be deleted. The exceptions list 126 collects exceptions thrown from activities. LLI 124 may be constructed as a simple counter and may count the numbers of the live activity or activities in the information processing apparatus. The latch 121, LLI 124, and exceptions list 126 may be managed within the local memory of the node and are not stored in the RS 130. Thus, the computation nodes may not have access to the RS 130 each time the computation nodes generate the live activity or activities such that the computation performance of the computation nodes may be significantly enhanced. The above improvement may improve overall computation performance of the distributed computation system.

Thus according to the present embodiment, via RLI 140 the home node knows which remote nodes have at least one live activity without knowing all of the computation statuses of the remote nodes. As described above, the home node can monitor the fault of the remote nodes by polling and can thereby promptly find the faulty remote node or remote nodes yet having a live activity. This architecture allows error recovery processes to start promptly so as to further improve the overall computation performance.

The information processing apparatus of FIG. 1 has been explained so far in this particular exemplary embodiment as being the home node, however the information processing apparatuses for the remote nodes may be implemented to have the same functional parts except for the latch 121 and the exceptions list 126. The remote node may in the described embodiment only be required to access the RS 130 just at the statuses of creation of the first live activity and of completion of all live activities. The simple remote nodes have no need to access the RS 130 even when executing the live activity or when catching exceptions.

Figure 2:
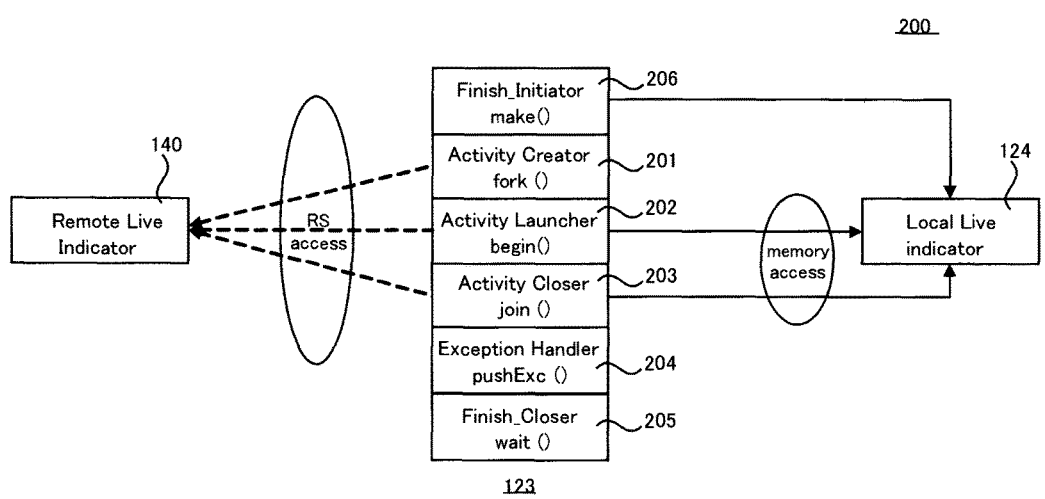
FIG. 2 shows an exemplary functional structure of a finish controller of the information processing apparatus and the embodiments of the access to a resilient store (RS).

FIG. 2 shows the detailed functional structure 200 of the finish controller 123 and examples of accesses to the RS 130 and the LLI 124. In FIG. 2, the program codes of the Resilient X10 programming language providing the functionalities of finish controller 123 are also appended as particular examples. The present techniques however are not limited to the Resilient X10 programming language and the present techniques are more generally applicable to any other compatible programming language.

The finish controller 123 may include a finish initiator 206, an activity creator 201, an activity launcher 202, and an activity closer 203. The finish initiator 206 is invoked at the home node to create a new computation by invoking the functional parts shown in FIG. 2. The activity creator 201 may be invoked on the home node and on a remote node. The term "source node," as used herein, refers to the node that instructs creation of activities to other "destination nodes." The activity creator 201 may define at least one activity to the destination node.

The activity launcher 202 may be invoked on the destination node and may instruct the start of the defined activity to create the live activity. The activity launcher 202 creates LLI 124 if the LLI 124 is not defined in the destination remote node and may increase the value of LLI 124 by one (1). Then, each time when the activity launcher 202 is invoked, the value of LLI 124 is increased to the number corresponding to the live activity on the relevant nodes. If the LLI 124 was newly created in that node, it means that this is the first activity on that node, so the activity launcher 202 further accesses the RS 130 to set the corresponding bit of the destination node in the RLI 140.

The activity closer 203 is invoked on the destination node upon completing the live activity and has the function to decrease the value of the LLI 124 in response to close of the live activity. Furthermore, the activity closer 203 examines whether or not the value of the LLI 124 is to be zero (0). When the value is zero (0), the activity closer 203 deletes the LLI 124, accesses the RS 130, and resets the value of the RLI 140 to binary zero (0) for the corresponding remote node. When the values in the RLI 140 become zero (0), the RLI 140 will be deleted from the RS 130.

The finish controller 123 further includes an exception handler 204 and a finish closer 205. The exception handler 204 may be invoked when exceptions occur in the particular node and the exception handler 204 registers the exceptions to the exceptions list 126. According to the present techniques, the exception handler 204 does not access the RS 130 when the exception is issued. Instead the exceptions are stored in the exceptions list 126 in the home node. The application will do the error recovery. For a detailed description of the error recovery process see, for example, Cunningham, the contents of which are incorporated by reference as if fully set forth herein.

The finish closer 205 further manages the closing of the finish state on the home node. The finish closer 205 decrements the LLI 124 for itself, and if LLI 124 becomes zero (0) then the above-described process is performed for deleting the LLI 124 and the RLI 140 when the value thereof is zero. When LLI 124 and RLI 140 are already deleted, the finish manager 205 may further clear the finish state and throws exceptions if they are in the exceptions list 126.

As described above, the functional parts of the finish controller 123 access the RS 130 when the first live activities are created in the remote node and when all of the activities on the remote node are completed instead of for the status of every activity in all of the nodes. Thus, the access frequencies to the RS 130 are significantly decreased by replacing them with memory accesses inside the home and remote nodes thereby improving the computation efficiency. In the present embodiment, a part of the storage accesses to the RS 130 will be replaced with local memory accesses such as via the LLI 124. In addition, the RS accesses of the activity creator 201, the activity launcher 202, and the activity closer 203 may be limited to particular times so as to significantly decrease the RS accesses. These functional parts may access the RS 130 only during those particular times. This limited access is depicted by broken arrows. Part of the RS access may be replaced to the local and non-resilient memory, such as the LLI 124 accesses shown by the solid line. The codes and the processing thereof will be detailed below.

Figure 3:
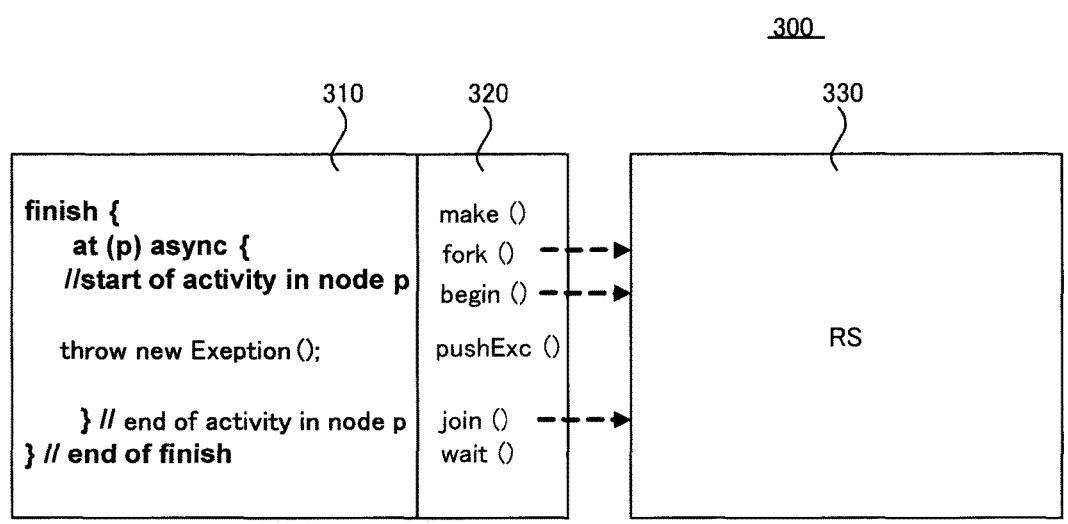
FIG. 3 shows the pseudo X10 program and what the interfaces provided by the finish controller are called. It is also shown whether these codes access the RS according to the present techniques.

FIG. 3 shows the pseudo X10 program and what the interfaces provided by the finish controller are called. It is also shown in FIG. 3 whether these codes access the RS 330 in the present invention. The home node is implemented with Java™ like codes 310 and the adequate compiler compiles the codes 310 into what are referred to herein as the present finish controller interface codes 320, such as make( ) fork( ) and wait( ) etc. The codes 320 such as make( ) and wait( ) may run on the home node and the code "fork( )" may be run on any node depending on the requirements for creating the activities on the other nodes. With the present extended version, only the code "fork( )" runs on the home node, and the codes "begin( )" and "join( )" both run on the remote nodes (by the instruction from the home node) and may access the RS 130 at limited times, such as only (1) at the creation of the first activity and (2) at the deletion of the last activity on the node. The other codes such as make( ) pushExc( ) and wait( ) shown in FIG. 2 and FIG. 3 do not have access to the RS 130. This means that the activity statuses in the remote nodes and the exceptions thereof are not managed by the RS 130.

It is now assumed that the particular remote node suffers a fault. The fault of the remote node may be detected by the home node by the polling process. The fault of the remote node means the loss of the results of activities. Considering the above situation, the home node and the RS 130 only know and manage the live states of the remote nodes relevant to the finish state without knowing all of the computing status using the resilient store to improve the computational performance.

Figure 4:
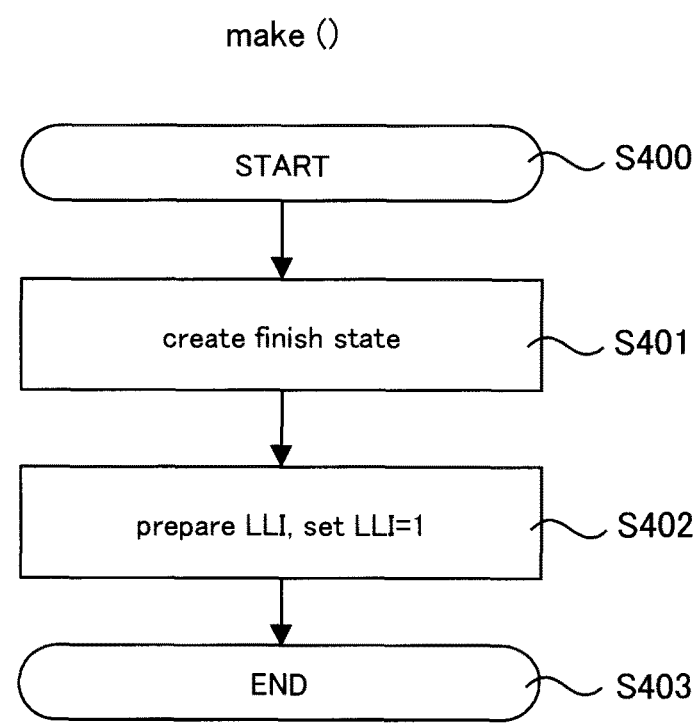
FIG. 4 shows the process executed on the nodes by the code "make( )".

FIG. 4 shows the processes executed by the nodes according to the present invention briefly explained in FIG. 2. In FIG. 4, the codes make( ) will be depicted. The code make( ) may be invoked on the home node to define a new finish state and the code make( ) starts in the step S400, and in the step S401, the home node defines a new finish state thereon. Then, in the step S402, the code prepares the LLI 124, sets the LLI 124 to one (1), and then goes to the step S403 to end the process.

Figure 5:
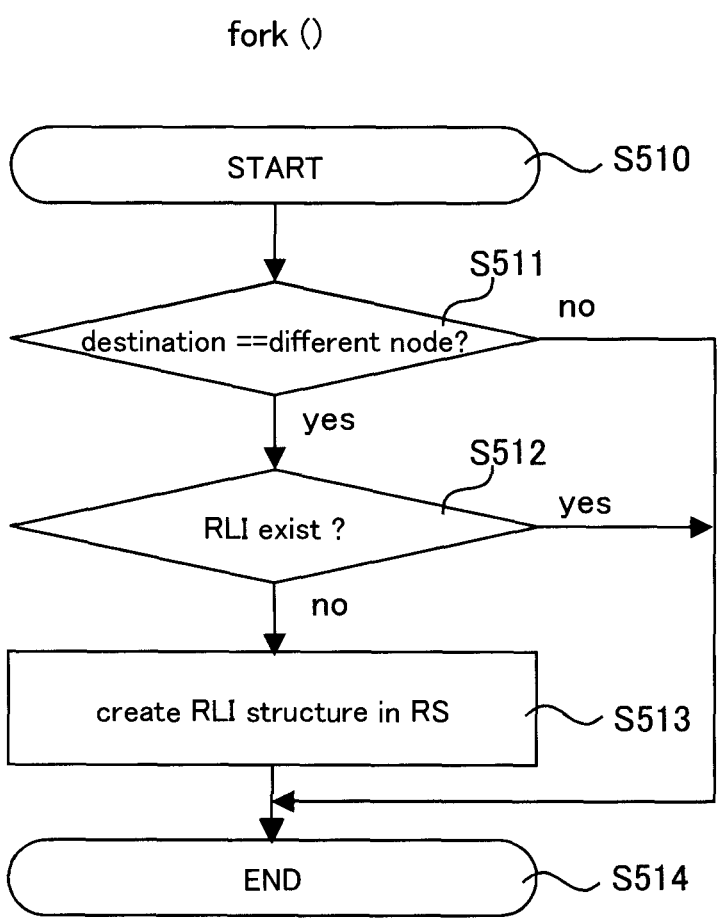
FIG. 5 shows the process executed on the nodes by the code "fork( )".

In FIG. 5, the detailed process of the code "fork( )" is shown. The code fork( ) will be invoked on any of the nodes when that node instructs the creation of an activity to another node. The code starts from the step S510 and a determination is made as to whether or not the destination of the created activity is a different node. When the destination is its own node (no), the process ends in step S514. However, if the determination in step S511 returns an affirmative result (yes), then the designated destination is a different node such that at least one activity in the different node will be created by the code. Then in step S512 the code determines whether or not the RLI structure is present. When the RLI structure is present (yes), the process diverts to the step S514 to end the process. When the RLI structure is not present on that node (no) (which means that the current node first accesses the resilient store), then the process in step S513 creates the RLI structure. Thereafter the process passes the control to the step S514 to end the processing.

Figure 6:
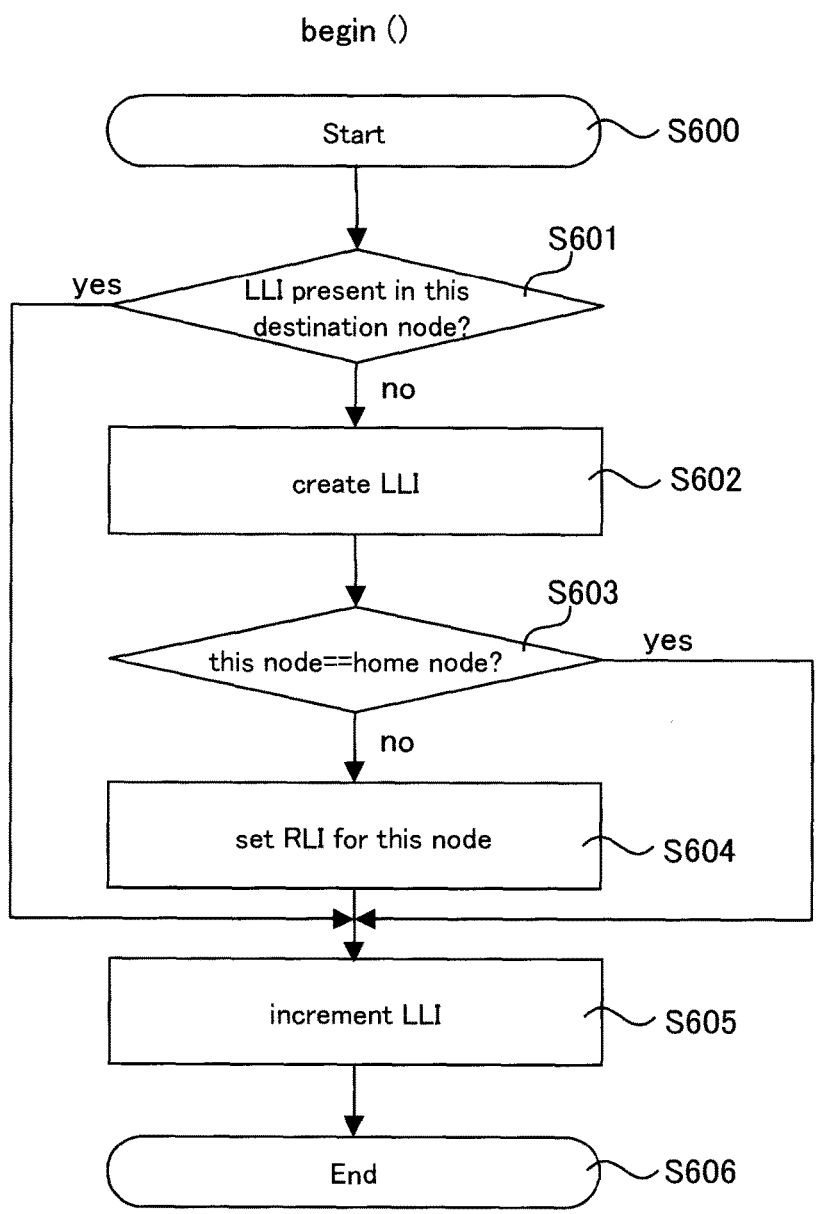
FIG. 6 shows the process executed by the code "begin( )".

Referring now to FIG. 6, the detailed process executed by the code "begin( )" will be described. The code "begin( )" is invoked on the destination node that has to run the activity in response to the code "fork( )". The process of the code starts from the step S600, and in the step S601 the code determines whether or not LLI 124 is already present in that destination node. When LLI 124 is already present (yes), the process diverts to step S605 for escaping the RS access and in the step S605, the code increases the value of the LLI by one (1) so that the value in LLI refers to the number of activities run thereon.

When the determination in the step S601 returns the negative result (no) (which indicates that the destination node first creates the activity), the code in step S602 creates LLI 124. In step S603 the process determines whether or not this node is the home node. If the determination returns an affirmative result (yes), then the process diverts to the step S605. When the determination returns a negative result (no) in the step S603, then as per step S604 the process sets RLI 140 in RS 130 as the meaningful value (i.e., set "1" to the corresponding bit of RLI) for the creation of the first activity. The code then in the step S605 increases the value of the LLI 124 by one (1) for registering the numbers of the live activity and then proceeds to step S606 to end the process.

Figure 7:
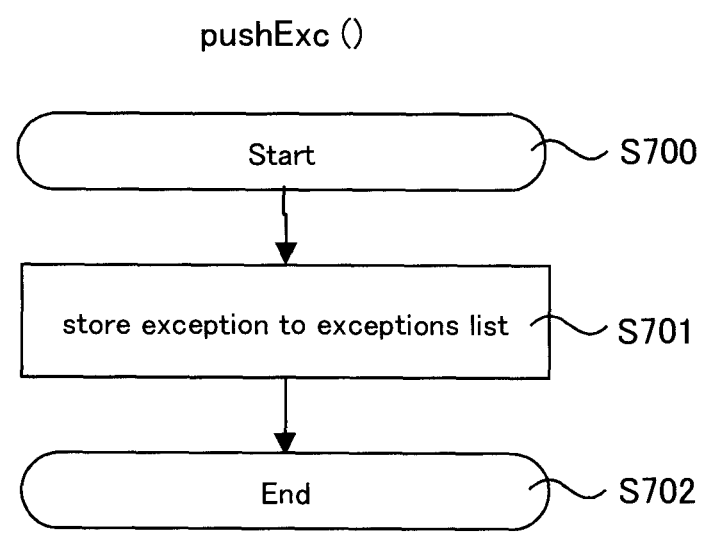
FIG. 7 shows the process of the code "pushExc( )" for handling the occurrence of an exception.

FIG. 7 shows the process of the code "pushExc( )" for handling the occurrence of an exception. The code starts from the step S700 when any exceptions occur on that node, and in the step S701 the code stores the error status of the activity to the exceptions list 126. This registration is performed in the local memory of the home node rather than the resilient store according to the present invention. Thereafter the code terminates the process in the step S702.

Figure 8:
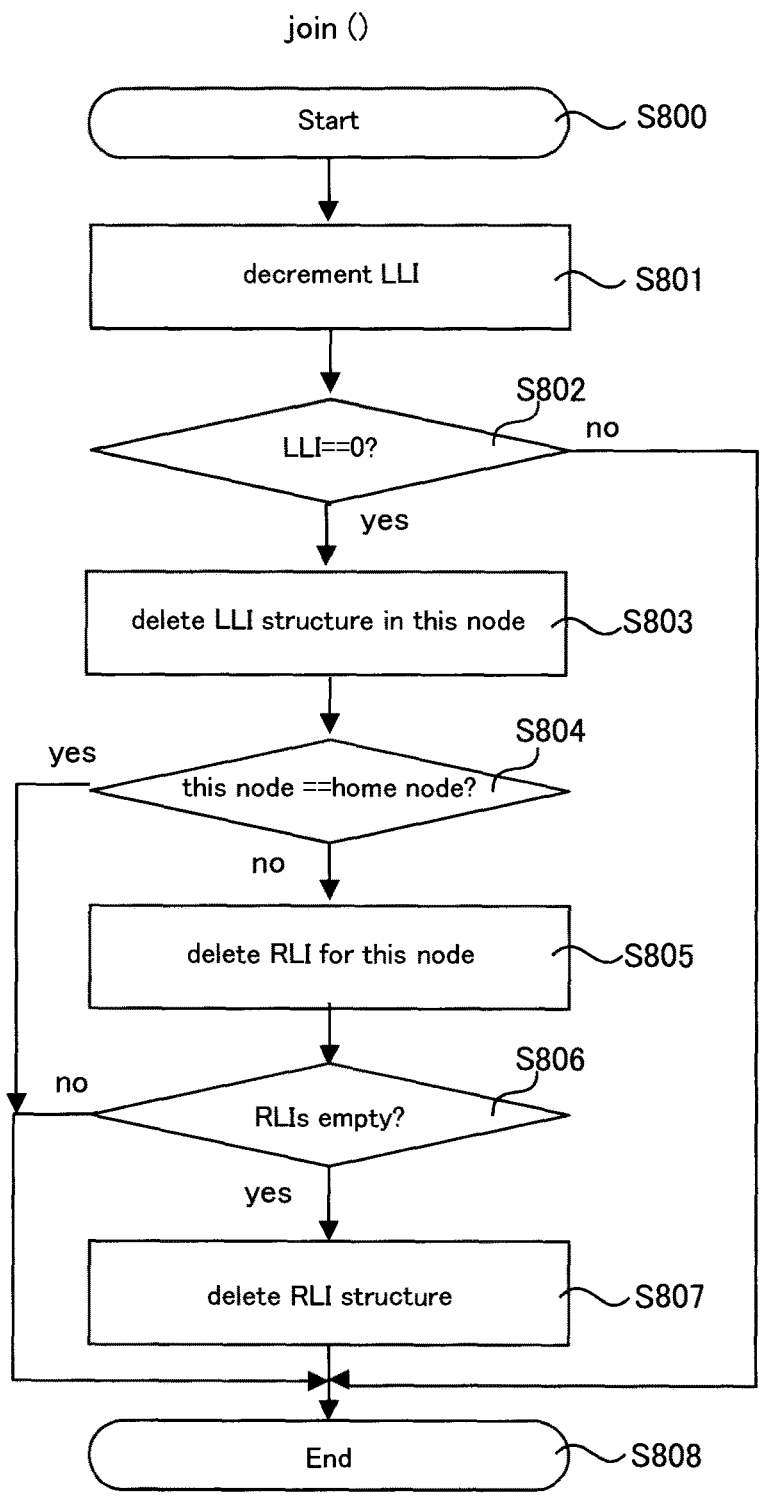
FIG. 8 shows the process executed by the code "join( )".

FIG. 8 shows the detailed process executed by the code "join( )" which is invoked when the activity is completed in the step S800 and any one of the live activities is completed. In the step S801, the code decreases the value of LLI 124 by one (1). In step S802, the code then determines whether or not the value of LLI 124 is zero (0).

When the value of LLI 124 is not zero (0) (no), the code reverts to the step S808 to end the process of the code "join( )". When the value of LLI 124 is zero (0) (yes), there is not any live activity in that node, and in step S803 the code deletes LLI structure on that node.

In step S804, the process then determines whether or not this node is the home node. When the determination returns affirmative result (yes), then the process diverts to the step S808 to end the process. When the determination in step S804 returns the negative result (no), then the code in the step S805 resets the corresponding bit of the RLI structure. In step S806, the code checks if all bits of RLIs in RS is empty. If so (yes), in step S807 the code deletes the RLI structure. Then the code goes to the step S808 to end the processing of "join( )". If RLIs are not empty (no), then the code diverts to the step S808 to end the process.

Figure 9:
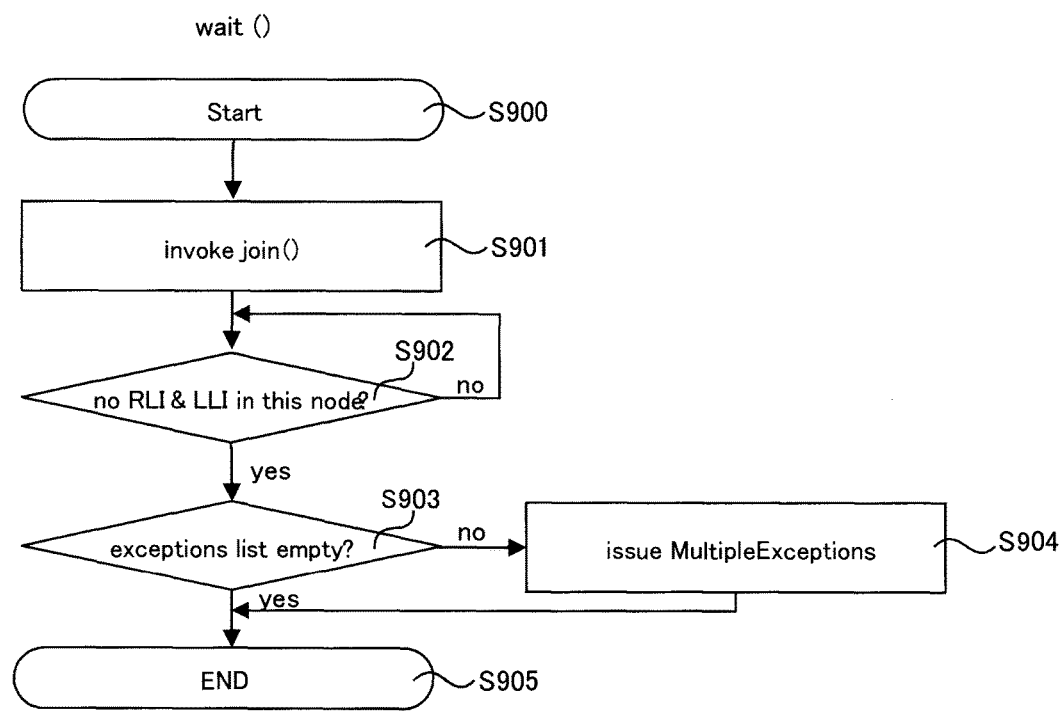
FIG. 9 shows the process being executed by the code "wait( )".

FIG. 9 shows the process being executed by the code "wait( )" to be run on the home node. The code starts at step S900 and in the step S901, the code invokes another code "join( )" (which was described in conjunction with the description of FIG. 8, above). In the step S902, the code then determines whether or not all activities under control are completed by examining that there are no RLI 140 and LLI 124 (i.e., this checks "there is no RLI in the RS" and "there is no LLI in this node (home node)". When the determination returns the negative result (no) (i.e., that there is no RLI 140 and LLI 124 in this node), then the code reverts back to step S902. When the determination returns the affirmative result (yes), then in the step S903 the code determines whether or not the exceptions list 126 is empty (i.e., to thereby examine if any of the activities suffered an exception). When the determination returns a negative result (no), then in step S904 the code issues the MultipleExceptions (which may contain the exceptions information) to the exceptions list 126 and goes to step S905 to end the process. When the determination in the step S903 returns an affirmative result (yes), then the process goes to the step S905 to end the process.

FIG. 10 shows a comparison of the RS access frequencies between the present extended Resilient X10 programming language (labeled "EXAMPLE") and the conventional Resilient X10 programming language (labeled "COMPARABLE EXAMPLE"). The conventional Resilient X10 programming language accesses the RS 130 at least one time for all of the codes; however, the present extended codes access the RS 130 at the limited computation stages of the start and end of the relevant computations while other codes access to the local memory, i.e., the LLI within that node.

In practical computations such as heat transfer analysis (see below) or other calculations, more finish states and activities may be created and terminated. Such frequent accesses to RS 130 significantly degrade the overall computation performance and the present invention may provide the scalability of the distributed computation independently with the computation scale.

FIG. 11 shows the results of a practical computation by implementing the present extended Resilient X10 programming language. The platform used were 8 servers (nodes) implemented with the following hardware and operating system:

CPU: Intel™ Xeon™ X5680, 3.3 GHz, 6 core 12 SMT,
OS: RHEL (Red Hat Enterprise Linux™) server 5.5.

The project for computation was distributed computation of the heat transfer by using ResilientHeatTransfer. x10 (see K. Kawachiya, "Writing Fault-Tolerant Applications Using Resilient X10," X10 Workshop 2014 (June 2014), the contents of which are incorporated by reference as if fully set forth herein) and the same data. The results shown in FIG. 11 are relative computational cost per computation stages to the conventional Resilient X10 programming language; wherein a value smaller than one (1) means a decrease in costs and in turn means the improvement of computation performance. As shown in FIG. 11, the present code significantly improves creation and wait of void activity within a particular node over about 40 times than the conventional code. Also the present invention improves creation and wait of void activity between different nodes.

With respect to the application execution time for the ResilientHeatTransfer, the application execution time was improved to be about twice that of the conventional Resilient X10 programming language; the real computation times were 64 sec for the conventional and 36 sec for the present invention. As described above, the present invention may improve the computation efficiency of the overall computation of the distributed computation.

Figure 12:
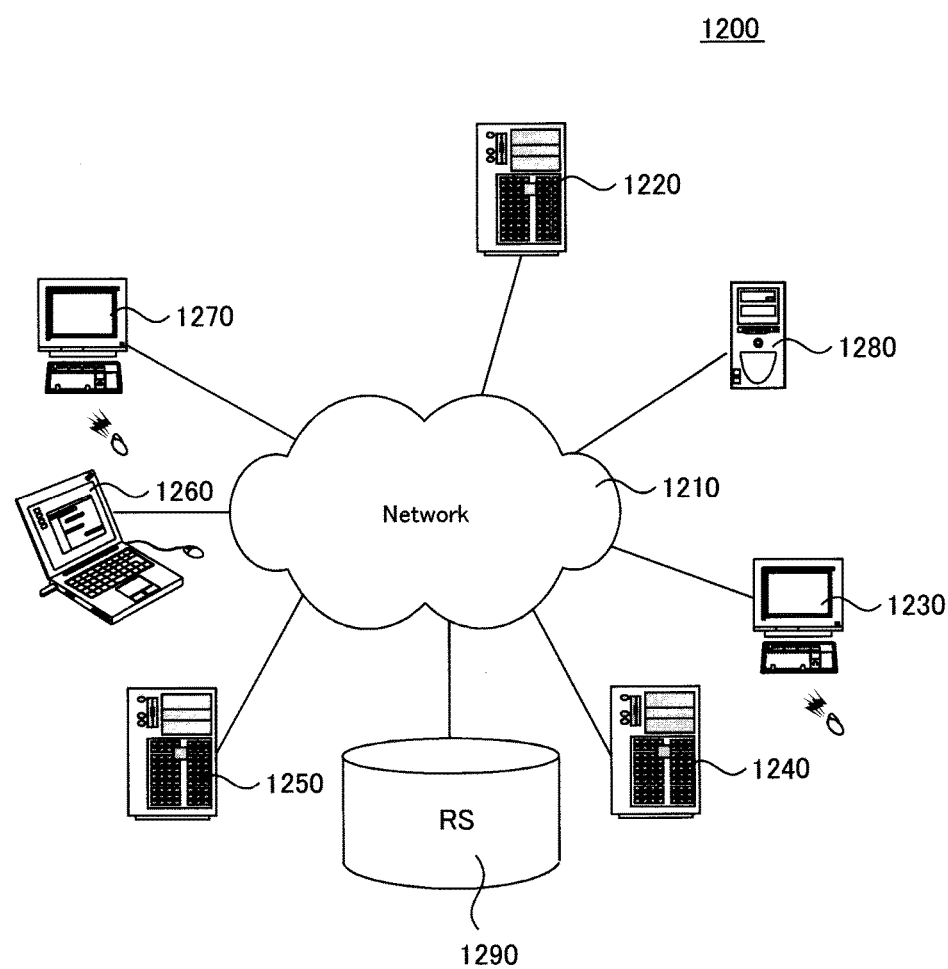
FIG. 12 shows the present distributed computing mechanism.

FIG. 12 shows the present distributed computing mechanism 1200. The distributed computing mechanism includes a plurality of information processing apparatus such as computers 1220-1280 networked through a network 1210 such as a LAN or the Internet. The computers 1220-1280 may implement the extended Resilient X10 programming language operated under an appropriate operating system such as Linux™, Unix™, or Windows™.

In the exemplary embodiment shown in FIG. 12, each of the computers manages the RS data structure according to its role in the distributed computation according to the present invention. In further preferred embodiments, the RS data structure may be constructed using the resilient stores preferably connected to RS 1290 through the network 1210. The nodes shown in FIG. 12 may access the RS 1290 to update the RLI structure in the limited frequency by the present invention such that the computation efficiency may be improved by omitting unnecessary RS access.

The present invention may be implemented in other network architectures including wireless communication environment such as Wi-Fi, 3G, 4G, IEEE803.11 series. In a system including wireless communications, the improvement of the present invention might be more useful because the exceptions may be handled within the remote nodes.

Figure 13:
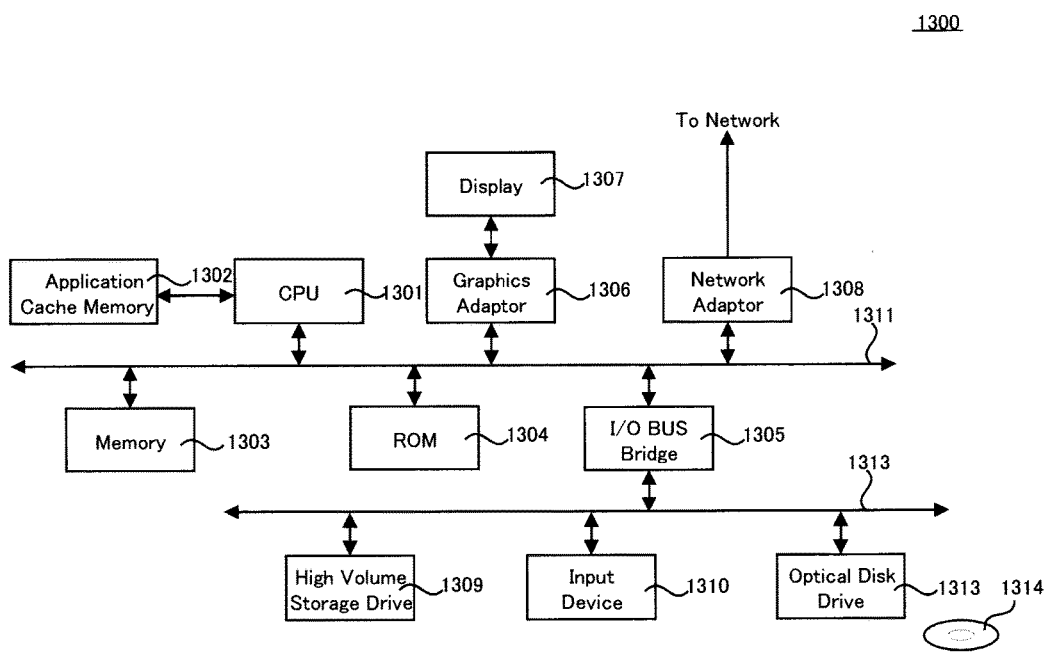
FIG. 13 shows an exemplary embodiment of the present information processing apparatus.

FIG. 13 shows an exemplary embodiment of the present information processing apparatus 1300 as a so-called computer. The information processing apparatus 1300 includes a central processing unit (CPU) 1301, an application cache memory 1302, and a memory 1303 interconnected through a system bus 1311. The CPU 1301 reads the program described in the present invention in the memory 1303 from the high volume storage drive 1309 such as a hard disk drive, tape drive or solid state disk and executes the programming code of the present invention. The application cache memory may be referred to L1-Ln cache for improving data access of the CPU 1301.

The information processing apparatus 1300 further includes a ROM 1304, a graphics adaptor 1306, and a network adaptor 1308. The ROM 1304 stores BIOS for initializing the information apparatus and for performing POST when its start. The graphics adaptor 1306 provides the video image under VGA or XGA etc. to a display 1307 for providing a human inter face to the information processing apparatus 1300. The network adaptor 1308 connects the information processing apparatus 1300 to the network through an appropriate transmission protocol such as TCP/IP, UDP.

The information processing apparatus 1300 includes I/O bus bridge 1305 such as PCI bridge and connects various devices such as the high volume storage drive 1309, input devices 1310 such as a key board, a mouse, etc. for providing another human interface and an optical disk drive 1313 which receives the optical disk 1314 and reads and writes the data thereto. In particular embodiments of the present invention, the high volume storage drive 1309 may be RAID system for the resilient store (RS).

The information processing apparatus runs the program codes of the present invention on an appropriate operating system (OS) such as Z/Architecture™, Linux™, Unix™, or Windows™ depending on the particular implementation of the apparatus, but not limited thereto, OS for the present invention may be used as far as the present extended Resilient X10 programming language may be run.

Figure 14:
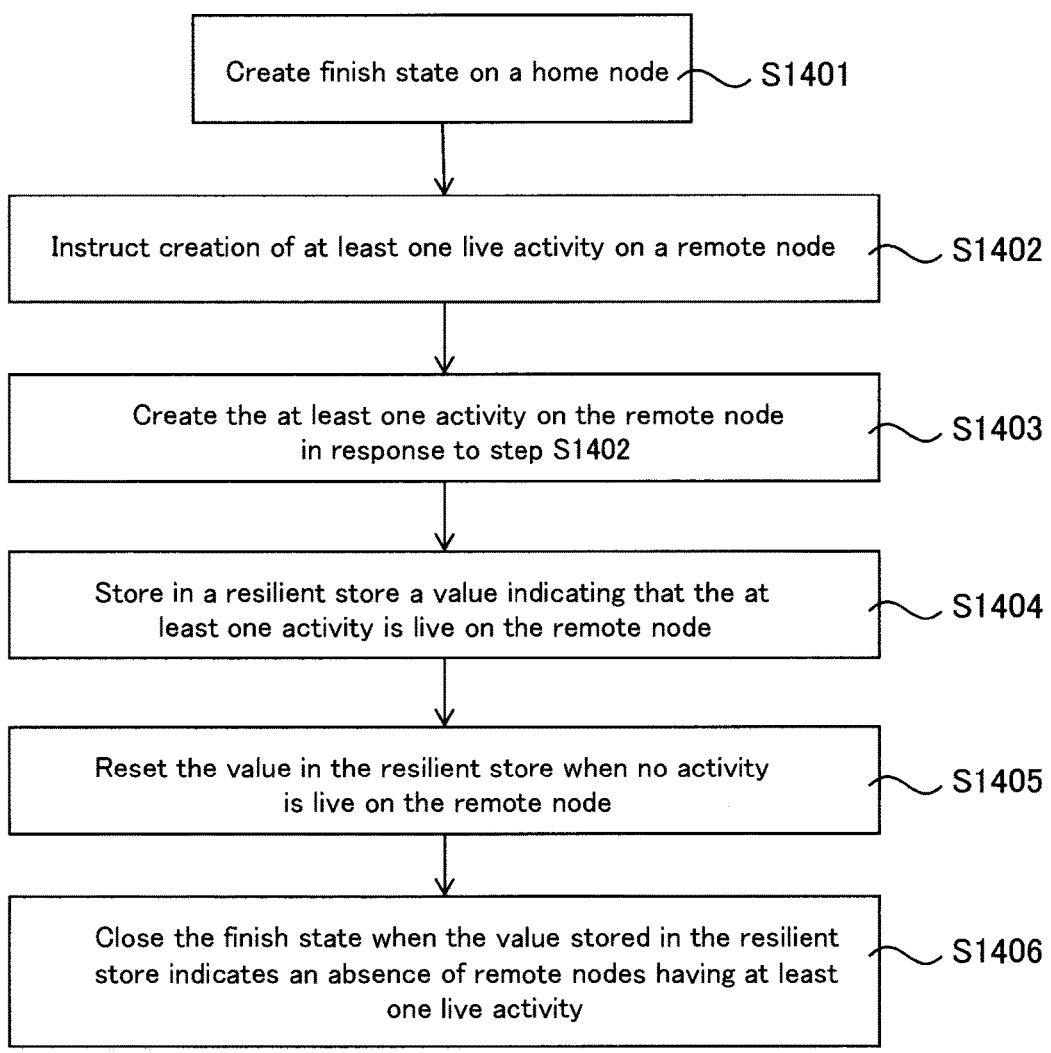
FIG. 14 shows an exemplary method according to the present techniques for fault-tolerant distributed computing that is executed by program codes tangibly stored in a memory of a computer node, the computer node being connected to a network for executing fault-tolerant distributed computing.

Given the above-description, FIG. 14 provides an exemplary method 1400 for fault-tolerant distributed computing that is executed by program codes tangibly stored in a memory of a computer node, the computer node being connected to a network for executing fault-tolerant distributed computing. According to method 1400, the computer node executes the following steps. In step S1401 a finish state is created on a home node. In step S1402, the creation of at least one activity on a remote node is instructed. In step S1403, in response to the instruction in step S1402, at least one activity is created on the remote node. In step S1404, a value is stored in a resilient store indicating that at least one activity is live on the remote node. In step S1405, the value in the resilient store is reset when no activity is live on the remote node. In step S1406, the finish state is closed when the value stored in the resilient store indicates an absence of remote nodes having at least one live activity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was described in order to best explain the principles of the invention and the practical application, and to enable others of ordinary skill in the art to understand the invention for various embodiments with various modifications as are suited to the particular use contemplated.

According to the present invention, useful and novel extension of Resilient X10 programming language which improves the computation performance of the distributed computation may be provided.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for fault-tolerant distributed computing that is executed by program codes tangibly stored in a memory of a computer node, the computer node being connected to a network for executing fault-tolerant distributed computing, the computer node executing the steps of:
    creating a finish state on a home node;
    instructing creation of at least one activity on a remote node;
    creating the at least one activity on the remote node in response to the instructing step;
    storing in a resilient store a value indicating that at least one activity is live on the remote node;
    resetting the value in the resilient store when no activity is live on the remote node, the method further comprising the step of limiting access to the resilient store for the storing and the resetting whereby the resilient store is accessed only at particular times so as to limit access frequency to the resilient store and thereby improve computation efficiency, the particular times being only (1) at the creation of a first one of the at least activity on the remote node and (2) at deletion of a last one of the at least one activity on the remote node; and
    closing the finish state when the value stored in the resilient store indicates an absence of remote nodes having at least one live activity.

2. The method of claim 1, wherein a local memory of the home node stores exceptions issued when activities suffer a fault.

3. The method of claim 1, wherein values stored in the resilient store indicate that nodes relevant to the finish state have at least one live activity.

4. The method of claim 1, wherein the storing comprises the step of:
    keeping the value in the resilient store unchanged until either another live activity is created on the remote node or no activity is live on the remote node.

5. The method of claim 1, further comprising the step of:
    storing in a local memory of each node a number of a currently living activities.

6. The method of claim 1, wherein the program codes are described in a Resilient X10 programming language.

7. An information processing apparatus, the information processing apparatus being connected to a network for executing fault-tolerant distributed computing, the information processing apparatus comprising:
    a finish initiator that creates a finish state on a home node;
    an activity creator that instructs creation of at least one activity on a remote node;
    an activity launcher that allows to store in a resilient store a value indicating that at least one live activity is present on the remote node and stores in a local memory a number of current living activities;
    an activity closer that decreases the number of current living activities in the local memory when a living activity is completed and resets the value in the resilient store to indicate that no live activity is present on the remote node, wherein the resilient store is accessed only at particular times by the activity launcher and the activity closer so as to limit access frequency to the resilient store and thereby improve computation efficiency, the particular times being only (1) at the creation of a first one of the at least activity on the remote node and (2) at deletion of a last one of the at least one activity on the remote node; and
    a finish closer that closes the finish state when the value stored in the resilient store indicates an absence of remote nodes having at least one live activity.

8. The information processing apparatus of claim 7, wherein the local memory of the home node stores exceptions issued when nodes suffer a fault.

9. The information processing apparatus of claim 7, wherein the values in the resilient store indicate that nodes relevant to the finish state have at least one live activity.

10. The information processing apparatus of claim 7, wherein the finish closer keeps the value in the resilient store unchanged until at least one of the live activities on the remote node is present.

11. A program product comprising a non-transitory computer readable storage medium having program codes recorded thereon, the program codes being tangibly stored in a memory of a computer and executing fault-tolerant distributed computing through a network, the program codes making the computer execute the steps of:
    creating a finish state on a home node;
    instructing creation of at least one activity on a remote node;
    creating the at least one activity on the remote node in response to the instructing step;
    storing in a resilient store a value indicating that at least one activity is live on the remote node;
    resetting the value in the resilient store when no activity is live on the remote node, and limiting access to the resilient store for the storing and the resetting whereby the resilient store is accessed only at particular times so as to limit access frequency to the resilient store and thereby improve computation efficiency, the particular times being only (1) at the creation of a first one of the at least activity on the remote node and (2) at deletion of a last one of the at least one activity on the remote node; and
    closing the finish state when the value stored in the resilient store indicates an absence of remote nodes having at least one live activity.

12. The program product of claim 11, wherein a local memory of the home node stores exceptions issued when nodes suffer a fault.

13. The program product of claim 11, wherein the values stored in the resilient store indicate that nodes relevant to the finish state have at least one live activity.

14. The program product of claim 11, wherein the storing step comprises the step of:
    keeping the value in the resilient store unchanged until either another live activity is created on the remote node or no activity is live on the remote node.

15. The program product of claim 11, wherein the program code further executes the step of:
    storing in a local memory of each node a number of a currently living activity.

16. The program product of claim 11, wherein the program codes are described in a Resilient X10 programming language.

17. A program product comprising a non-transitory computer readable storage medium having program codes recorded thereon, the program codes being tangibly stored in a memory of a computer and executing fault-tolerant distributed computing through a network, the program codes making the computer execute the steps of:

creating a finish state on a home node;
instructing creation of at least one activity on a remote node;
creating the at least one activity on the remote node in response to the instructing step;
storing in a resilient store a value indicating that at least one activity is live on the remote node and storing in a local memory a number of current living activities;
resetting the value in the resilient store when no activity is live on the remote node, and limiting access to the resilient store for the storing and the resetting whereby the resilient store is accessed only at particular times so as to limit access frequency to the resilient store and thereby improve computation efficiency, the particular times being only (1) at the creation of a first one of the at least activity on the remote node and (2) at deletion of a last one of the at least one activity on the remote node; and
closing the finish state when the value stored in the resilient store indicates an absence of remote nodes having at least one live activity, wherein values stored in the resilient store indicate that nodes relevant to the finish state have at least one live activity, wherein the value in the resilient store is unchanged until either another live activity is created on the remote node or no activity is live on the remote node, and wherein the program codes are described in a Resilient X10 programming language.

* * * * *